Patented Oct. 11, 1938

2,132,945

UNITED STATES PATENT OFFICE 2,132,945

PROCESS FOR OBTAINING MORPHINE AND CODEINE

Albert Frey, Riehen, near Basel, and Heinz Moritz Wüest, Arlesheim, near Basel, Switzerland, assignors to Hoffman-La Roche Inc., Nutley, N. J., a corporation of New Jersey No Drawing. Application April 3, 1936, Serial No. 72,660. In Switzerland June 7, 1935

4 Claims. (Cl. 260—285)

The problem of isolating the opium alkaloids directly from the ripe or unripe poppy plants instead of from the dried latex of the poppy has repeatedly been the object of investigation. Various patents have been issued which cover processes for obtaining the opium alkaloids directly from the poppy plant (German Patents 232,126, 524,964, French Patent 748,308).

That the direct production of morphine from the poppy plant has up to now only been carried out on a technical scale in isolated instances, is due to the great difficulties which have to be overcome in working up the extracts inasmuch as these contain very small quantities of the alkaloid and large quantities of impurities. Up to now the very dilute alkaloid solutions were evaporated and the impurities removed by precipitation. The reverse process, that is to say the extraction of the alkaloids from the dilute solutions, appeared to be impracticable and was consequently not attempted, because the formation of emulsions and the simultaneous passage of the impurities and alkaloids into the organic solvent used for the extraction was to be expected.

It has now been found that the extraction of the alkaloids from the enormous excess of aqueous solvent and their separation from the large quantities of impurities with suitable organic solvents can be carried out in a technically economical and easy manner and that thereby yields are obtained which greatly exceed those of the technical methods used heretofore.

The acid or neutral aqueous extracts of ripe or unripe poppy plants or portions thereof are brought to a pH of about 9 by the addition of weak alkalis such as sodium or ammonium carbonate, or in the case of aqueous-alkaline extracts by the addition of acids. From the solutions treated in this way the alkaloids are extracted with organic solvents which dissolve morphine and codeine and easily release these alkaloids again, such as chloroform, butanol, amyl-alcohol and the like, or with mixtures of such solvents. Morphine and codeine are taken up by the solvent without formation of emulsions and without admixture with any considerable quantities of impurities. From the organic solvent the alkaloids may be obtained in the usual manner, for instance by transformation into concentrated aqueous alkaloid salt solutions by stirring with dilute acids and precipitating the alkaloids. After removal of the alkaloids the organic solvent is almost free from impurities and may be used for further extractions without distillation. It is possible in this way with the aid of small quantities of organic solvent to extract the alkaloids completely and in a very economical manner in spite of the great dilution in which they are present and of the generally rather unfavorable distribution-coefficient of morphine between water and organic solvents.

The great improvement in the yields obtained with the process claimed by this invention is due to the fact that with the methods used heretofore large quantities of the alkaloids were lost in the prolonged process of evaporation and particularly by occlusion and adsorption during the precipitation of the impurities, whereas with the new process these losses can be avoided.

Example 1

6000 kilograms of ground air-dried poppy straw, consisting to a considerable extent of poppy heads, are extracted with water in 6 batches of 1000 kilograms each on the countercurrent principle, so that the almost saturated solution is used for extracting fresh straw and the almost exhausted straw extracted with fresh water. About 20 cubic metres of extract are obtained and this is brought to a pH of about 9 by the addition of sodium carbonate and then extracted with a mixture of equal volumes of butanol and benzene in an extraction-column for liquids. The extracting agent charged with the alkaloids is conducted through dilute acid which takes up the alkaloids, whereupon the butanol-benzene mixture is used for continuing the extraction of the aqueous solution. The complete transfer of the alkaloids from the aqueous plant-extract to the acid solution is accomplished in less than 48 hours. The acid solution of the alkaloids is brought to a pH of about 9 at 50° C. with powdered sodium carbonate and the precipitated morphine is separated from the solvent. From the filtrate the codeine is extracted with benzene and purified as sulphate. Thus 34.6 kilograms of dry crude morphine containing 83.87% of pure anhydrous morphine base corresponding to 0.484% of the air-dried poppy plant, and 1.2 kilograms of anhydrous codeine base are obtained.

Example 2

1000 kilograms of dried, ground poppy plants are stirred with 7000 liters of water. After a few hours 100 kilograms of slaked lime are added, care being taken to ensure a thorough mixing. The mass reacts strongly alkaline to phenolphthalein. The product is then filtered and the residue washed, whereby the filtrates are collected separately and used for a second quantity of 1000 kilograms. The separate filtrates are, especially if not immediately used again, rendered neutral or slightly acid to litmus paper by the addition of dilute hydrochloric or sulphuric acid. 6 batches of 1000 kilograms each yield about 25 cubic metres solution. The alkaloid solution is slightly acidified by the addition of a little hydrochloric acid and then brought to a pH of about 9 by the addition of powdered sodium carbonate. After removing a minute precipitate of calcium carbonate by filtration, the alkaloids are extracted by treatment with a mixture of about 1000 liters each of butanol and benzene and obtained in the manner described in Example 1.

*Example 3*

100 kilograms of poppy heads are extracted according to the method given in the German Pharmacopoeia, 3rd edition, page 277, and the small quantities of alcohol present in the filtrates evaporated in vacuo. By the addition of ammonium carbonate the pH of the aqueous solution is brought to about 9 and the morphine and codeine bases extracted with amylalcohol. The removal of the morphine and codeine from the organic solvent into dilute aqueous acid and the isolation of the pure alkaloids is performed in the usual manner.

*Example 4*

1000 kilograms of finely divided fresh unripe poppy plants are exhaustively extracted with acidified water and the aqueous solution consisting of about 9000 liters evaporated in vacuo to 6000 liters. The aqueous extract containing the alkaloids is treated in the manner described in Example 3.

We claim:

1. The process for obtaining morphine and codeine from aqueous extracts of ripe or unripe poppy plants or portions thereof, which consists in transferring the alkaloid bases morphine and codeine from these solutions, without considerable evaporation and without removing the impurities, at a pH of about 9 by direct extraction into an organic solvent immiscible with said aqueous extracts which dissolves morphine and codeine and easily releases these alkaloids again, and recovering the morphine and codeine from the solvent.

2. The process for obtaining morphine and codeine from aqueous extracts of ripe or unripe poppy plants or portions thereof, which consists in transferring the alkaloid bases morphine and codeine from these solutions, without considerable evaporation and without removing the impurities, at a pH of about 9 by direct extraction into a mixture of organic solvents immiscible with said aqueous extracts which dissolves morphine and codeine and easily releases these alkaloids again, and recovering the morphine and codeine from the solvent.

3. The process for obtaining morphine and codeine from aqueous extracts of ripe or unripe poppy plants or portions thereof, which consists in transferring the alkaloid bases morphine and codeine from these solutions, without considerable evaporation and without removing the impurities, at a pH of about 9 by direct extraction into amylalcohol and recovering the morphine and codeine from the solvent.

4. The process for obtaining morphine and codeine from aqueous extracts of ripe or unripe poppy plants or portions thereof, which consists in transferring the alkaloid bases morphine and codeine from these solutions, without considerable evaporation and without removing the impurities, at a pH of about 9 by direct extraction into a mixture of butanol and benzene and recovering the morphine and codeine from the solvent mixture.

ALBERT FREY.
HEINZ MORITZ WÜEST.